Dec. 16, 1924. 1,519,182
W. F. ZIMMERMANN
HOLLOW BUTT WELDED PISTON FOR SAND RAMMERS
Filed June 9, 1924
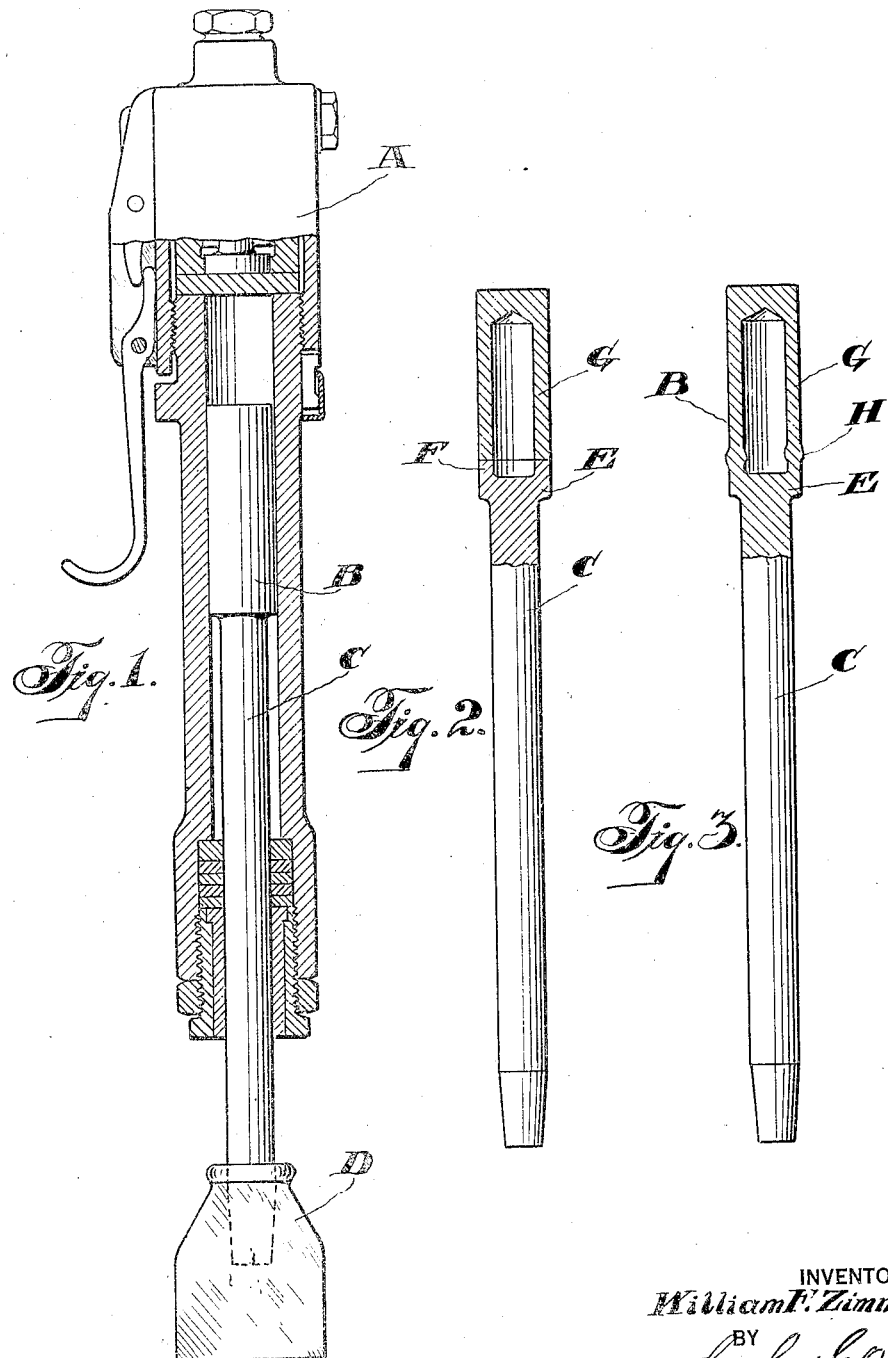
INVENTOR
William F. Zimmermann
BY
Herbert G. Ogden
HIS ATTORNEY Patented Dec. 16, 1924.

1,519,182

UNITED STATES PATENT OFFICE.

WILLIAM F. ZIMMERMANN, OF WAVERLY, NEW YORK, ASSIGNOR TO INGERSOLL-RAND COMPANY, OF JERSEY CITY, NEW JERSEY, A CORPORATION OF NEW JERSEY.

HOLLOW BUTT-WELDED PISTON FOR SAND RAMMERS.

Application filed June 9, 1924. Serial No. 719,008.

*To all whom it may concern:*

Be it known that I, WILLIAM F. ZIMMERMANN, a citizen of the United States, and a resident of Waverly, county of Tioga, and State of New York, have invented a certain Hollow Butt-Welded Piston for Sand Rammers, of which the following is a specification, accompanied by drawings.

This invention relates to pistons, and more particularly to pistons for pneumatically operated tools, in which the piston rod is integrally formed with the piston head.

Piston rods for tools of the character referred to are required to be constructed as light as possible, and for this reason, it has been generally found desirable to form the piston head hollow. This is particularly true where the blow to be delivered by the tool is relatively light as in the case of pneumatic sand rammers in which the blow delivered by the pein is not heavy. The shank or piston rod supporting the pein is in itself of considerable weight to deliver the proper momentum and force to the blow. It has been found impractical to close the end of the hollow piston by means of a plug screwed or pressed into place since such plugs invariably work loose and cause trouble.

It is an object of this invention to form a hollow piston closed at both ends of parts welded together in such a manner that the piston is durable.

Other objects and advantages of the invention will be in part obvious and in part pointed out hereinafter.

The drawing illustrates one form which the invention may assume in practice and includes, Figure 1, an assembly view in longitudinal section, of a sand rammer showing the finished piston in position in the tool, Figure 2, a view partly in longitudinal section showing the parts of which the piston is composed, placed together before joining by welding, and Figure 3, a view partly in longitudinal section of the piston after welding and before finishing or grinding.

Referring to the drawings, the piston shown is of the type employed in a pneumatic sand rammer A which may be of a well known type. The piston B is adapted to reciprocate within the cylinder of the sand rammer and is attached integrally with a shank or piston rod C which, at the end projecting through the front end of the tool, is adapted to support a pein D of any suitable type. The piston B is adapted to reciprocate at high speed within the cylinder and when formed hollow for the purpose of lightening and decreasing its inertia effects, must be sealed very securely, that is to say, by a device which will not shake loose.

Every means which has heretofore been employed, such as plugs screwed or pressed in the end of the piston to close its hollow end, has been defective in that the high speed of the machine causes it to work loose and interfere with the operation of the tool. In accordance with this invention the piston is formed of two parts. The shank C is provided at its upper end with a cylindrical cup shaped piston part E relatively short so that only a short annular ring F projects from the main part of the shank. The piston part B is formed principally by an inverted cylindrical cup shaped part G which is relatively long as compared with the ring F. When the part G is placed on the ring F, the two parts form a hollow piston with no outlet to the exterior.

With the parts G and E in juxtaposition, a molecular union is made therebetween, such as by electric butt welding, and thus, the piston B is formed in a single integral piece in which there are no parts to work loose to cause trouble. In welding the parts G and E together there is formed a ridge or head H which may be turned or ground down to form the finished piston B as shown in Figure 1.

It has been found that the piston B is much more durable when the part G is relatively long as compared with the part F. If formed otherwise, the piston has been found to be not very solid and will easily break. It has also been found that a satisfactory durable piston cannot be constructed by welding a plug in place to close the interior of the piston as the weld will in most cases come apart or cause other trouble.

I claim:

1. A piston for pneumatic sand rammers and the like comprising a shank having a cup shaped piston end and a relatively long cup shaped piston part molecularly joined to the cup shaped end of the shank.

2. A piston for pneumatic sand rammers and the like formed from a shank having an enlarged cylindrical cup shaped open piston end, and a relatively long cylindrical cup shaped piston part having its open end electrically butt welded to the cup shaped end on said shank.

In testimony whereof I have signed this specification.

WILLIAM F. ZIMMERMANN.